United States Patent
Blumrich et al.

(10) Patent No.: US 7,383,397 B2
(45) Date of Patent: Jun. 3, 2008

(54) METHOD AND APPARATUS FOR FILTERING SNOOP REQUESTS USING A SCOREBOARD

(75) Inventors: Matthias A. Blumrich, Ridgefield, CT (US); Alan G. Gara, Mount Kisco, NY (US); Thomas R. Puzak, Ridgefield, CT (US); Valentina Salapura, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 248 days.

(21) Appl. No.: 11/093,160

(22) Filed: Mar. 29, 2005

(65) Prior Publication Data

US 2006/0224840 A1    Oct. 5, 2006

(51) Int. Cl.
*G06F 12/00* (2006.01)
*G06F 13/00* (2006.01)

(52) U.S. Cl. .................. 711/146; 711/118; 711/154
(58) Field of Classification Search .............. 711/100, 711/117, 118, 131, 144, 146, 154
See application file for complete search history.

(56) References Cited

U.S. PATENT DOCUMENTS

| | | | |
|---|---|---|---|
| 5,276,826 A * | 1/1994 | Rau et al. .................. 711/5 |
| 5,572,701 A | 11/1996 | Ishida et al. |
| 5,659,710 A * | 8/1997 | Sherman et al. ............ 711/146 |
| 5,966,729 A | 10/1999 | Phelps |
| 6,389,517 B1 | 5/2002 | Moudgal et al. |
| 6,704,845 B2 | 3/2004 | Anderson et al. |
| 7,117,312 B1 * | 10/2006 | Cypher ...................... 711/146 |
| 2003/0065843 A1 | 4/2003 | Jones et al. |
| 2003/0070016 A1 | 4/2003 | Jones et al. |
| 2003/0126376 A1 * | 7/2003 | Blankenship et al. ....... 711/146 |
| 2003/0135696 A1 | 7/2003 | Rankin et al. |
| 2004/0003184 A1 | 1/2004 | Safranek et al. |
| 2005/0138289 A1 * | 6/2005 | Royer et al. ................ 711/118 |

OTHER PUBLICATIONS

Moshovos, et al., "JETTY: Filtering Snoops for Reduced Energy Consumption in SMP Servers", The Proceedings of the 7th International Symposium on High-Performance Computer Architecture.

* cited by examiner

*Primary Examiner*—Tuan V. Thai
(74) *Attorney, Agent, or Firm*—Scully, Scott, Murphy & Presser, P.C.; Daniel P. Morris, Esq.

(57) ABSTRACT

An apparatus for implementing snooping cache coherence that locally reduces the number of snoop requests presented to each cache in a multiprocessor system. A snoop filter device associated with a single processor includes one or more "scoreboard" data structures that make snoop determinations, i.e., for each snoop request from another processor, to determine if a request is to be forwarded to the processor or, discarded. At least one scoreboard is active, and at least one scoreboard is determined to be historic at any point in time. A snoop determination of the queue indicates that an entry may be in the cache, but does not indicate its actual residence status. In addition, the snoop filter block implementing scoreboard data structures is operatively coupled with a cache wrap detection logic means whereby, upon detection of a cache wrap condition, the content of the active scoreboard is copied into a historic scoreboard and the content of at least one active scoreboard is reset.

12 Claims, 8 Drawing Sheets

METHOD AND APPARATUS FOR FILTERING SNOOP REQUESTS USING A SCOREBOARD

CROSS-REFERENCE TO RELATED APPLICATIONS

This application relates to commonly-owned, co-pending U.S. patent application Ser. Nos. 11/093,130; 11/093,131; 11/093,154; 11/093,152; 11/093,127; and 11/093,132 all filed on even date herewith and incorporated by reference as if fully set forth herein.

BACKGROUND OF THE INVENTION

1. Field of the Invention

The present invention generally relates to computer systems having multiprocessor architectures and, more particularly, to a novel multi-processor computer system for processing memory accesses requests and the implementation of cache coherence in such multiprocessor systems.

2. Description of the Prior Art

To achieve high performance computing, multiple individual processors have been interconnected to form multiprocessor computer system capable of parallel processing. Multiple processors can be placed on a single chip, or several chips—each containing one or several processors—interconnected into a multiprocessor computer system.

Processors in a multiprocessor computer system use private cache memories because of their short access time (a cache is local to a processor and provides fast access to data) and to reduce number of memory requests to the main memory. However, managing caches in multiprocessor system is complex. Multiple private caches introduce the multi-cache coherency problem (or stale data problem) due to multiple copies of main memory data that can concurrently exist in the multiprocessor system.

Small scale shared memory multiprocessing system have processors (or groups thereof) interconnected by a single bus. However, with the increasing speed of processors, the feasible number of processors which can share the bus effectively decreases.

The protocols that maintain the coherence between multiple processors are called cache coherence protocols. Cache coherence protocols track any sharing of data block between the processors. Depending upon how data sharing is tracked, cache coherence protocols can be grouped into two classes: 1) Directory based and 2) Snooping.

In directory based approach, the sharing status of a block of physical memory is kept in just one location called the coherency directory. Coherency directories are generally large blocks of memory which keep track of which processor in the multiprocessor computer system owns which lines of memory. Disadvantageously, coherency directories are typically large and slow. They can severely degrade overall system performance since they introduce additional latency for every memory access request by requiring that each access to the memory go through the common directory.

Figure 1:
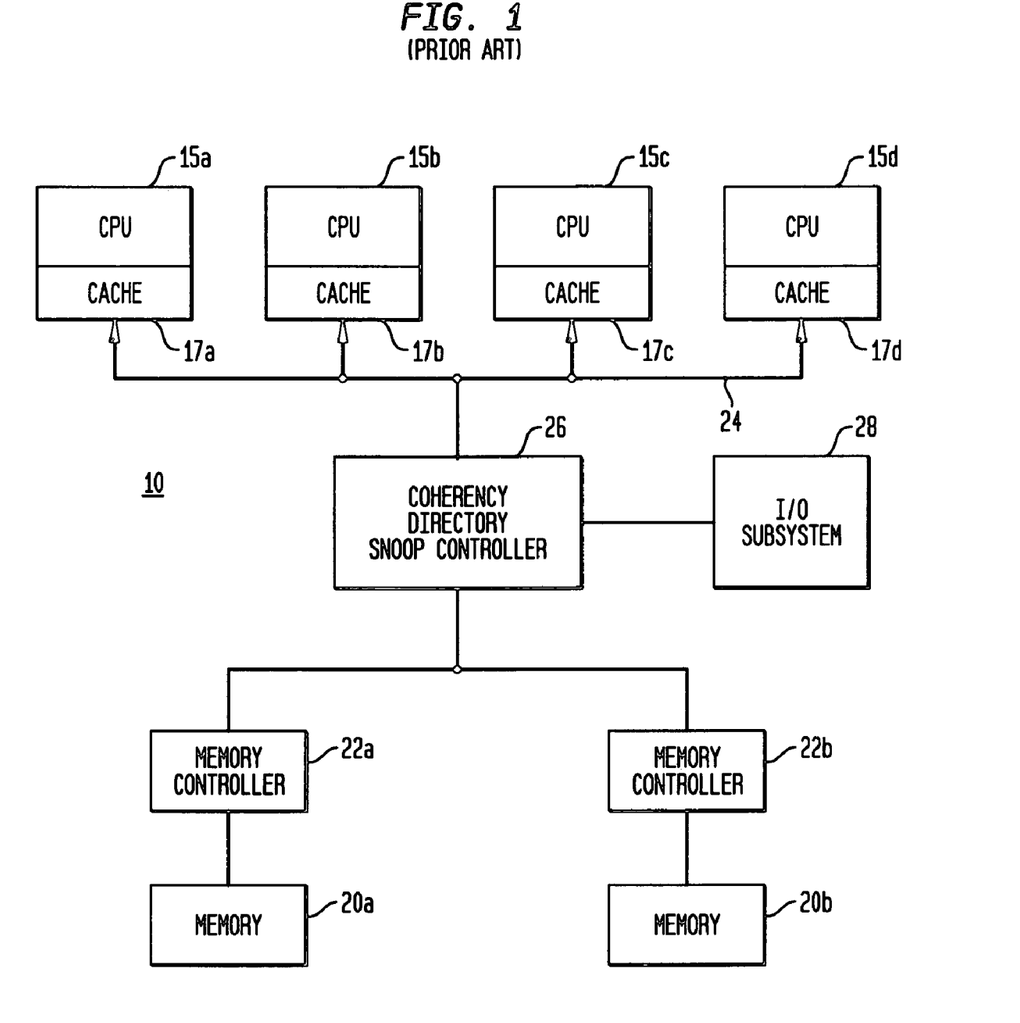
FIG. 1 depicts a base multiprocessor architecture with the coherence directory for cache coherency according to the prior art.

FIG. 1 illustrates a typical prior art multiprocessor system 10 using the coherence directory approach for cache coherency. The multiprocessor system 10 includes a number of processors 15a, . . . ,15d interconnected via a shared bus 24 to the main memory 20a, 20b via memory controllers 22a, 22b, respectively. Each processor 15a, . . . ,15d has its own private cache 17a, . . . ,17d, respectively, which is N-way set associative. Each request to the memory from a processor is placed on the processor bus 24 and directed to the coherency directory 26. Frequently, in the coherency controller, a module is contained which tracks the location of cache lines held in particular subsystems to eliminated the need to broadcast unneeded snoop request to all caching agents. This unit is frequently labeled "snoop controller" or "snoop filter". All memory access requests from the I/O subsystem 28 are also directed to the coherency controller 26. Instead of the main memory, secondary cache connected to the main memory can be used. Processors can be grouped into processor clusters, where each cluster has its own cluster bus, which is then connected to the coherency controller 26. As each memory request goes through the coherence directory, additional cycles are added to each request for checking the status of the requested memory block.

In a snooping approach, no centralized state is kept, but rather each cache keeps the sharing status of data block locally. The caches are usually on a shared memory bus, and all cache controllers snoop (monitor) the bus to determine whether they have a copy of the data block requested. A commonly used snooping method is the "write-invalidate" protocol. In this protocol, a processor ensures that it has exclusive access to data before it writes that data. On each write, all other copies of the data in all other caches are invalidated. If two or more processors attempt to write the same data simultaneously, only one of them wins the race, causing the other processors' copies to be invalidated.

To perform a write in a write-invalidate protocol based system, a processor acquires the shared bus, and broadcasts the address to be invalidated on the bus. All processors snoop on the bus, and check to see if the data is in their cache. If so, these data are invalidated. Thus, use of the shared bus enforces write serialization.

Disadvantageously, every bus transaction in the snooping approach has to check the cache address tags, which could interfere with CPU cache accesses. In most recent architectures, this is typically reduced by duplicating the address tags, so that the CPU and the snooping requests may proceed in parallel. An alternative approach is to employ a multilevel cache with inclusion, so that every entry in the primary cache is duplicated in the lower level cache. Then, snoop activity is performed at the secondary level cache and does not interfere with the CPU activity.

Figure 2:
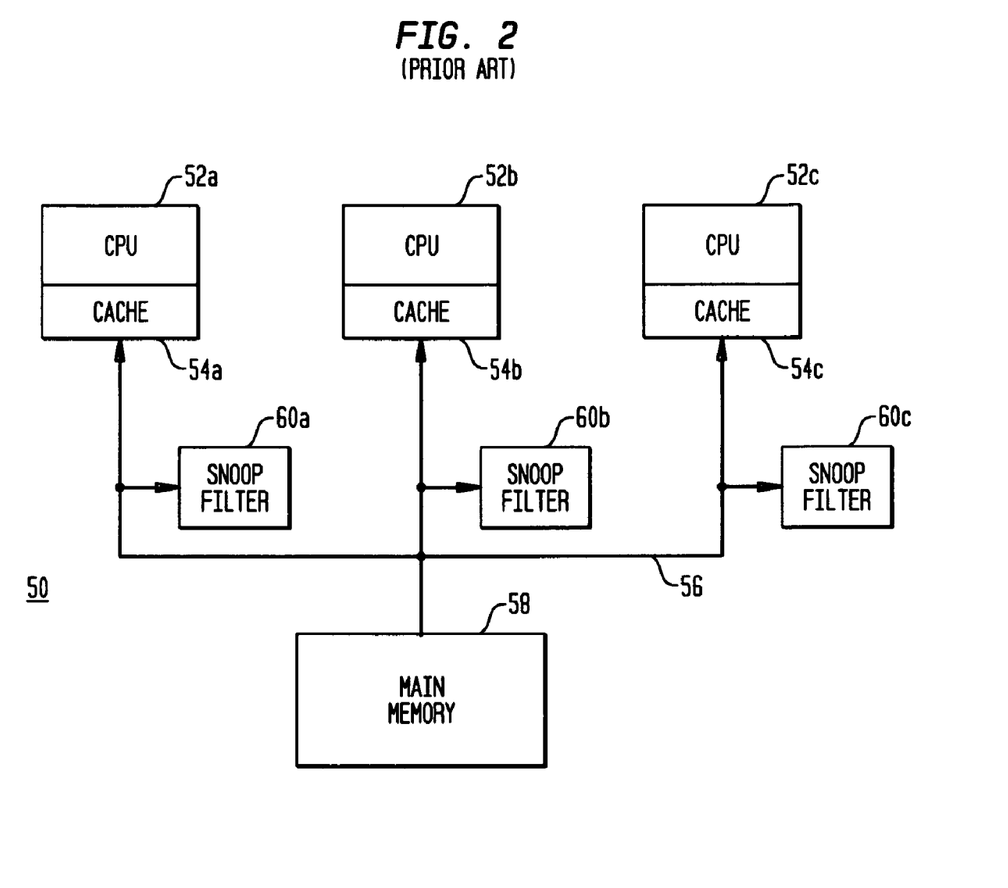
FIG. 2 depicts a base multiprocessor system using snooping approach for cache coherency according to the prior art.

FIG. 2 illustrates a typical prior art multiprocessor system 50 using the snooping approach for cache coherency. The multiprocessor system 50 contains number of processors 52a, . . . ,52c interconnected via a shared bus 56 to the main memory 58. Each processor 52a, . . . ,52c has its own private cache 54a, . . . ,54c which is N-way set associative. Each write request to the memory from a processor is placed on the processor bus 56. All processors snoop on the bus, and check their caches to see if the address written to is also located in their caches. If so, the data corresponding to this address are invalidated. Several multiprocessor systems add a module locally to each processor to track if a cache line to be invalidated is held in the particular cache, thus effectively reducing the local snooping activity. This unit is frequently labeled "snoop filter". Instead of the main memory, secondary cache connected to the main memory can be used.

With the increasing number of processors on a bus, snooping activity increases as well. Unnecessary snoop requests to a cache can degrade processor performance, and each snoop requests accessing the cache directory consumes power. In addition, duplicating the cache directory for every processor to support snooping activity significantly increases the size of the chip. This is especially important for systems on a single chip with a limited power budget.

What now follows is a description of prior art references that address the various problems of conventional snooping approaches found in multiprocessor systems.

Particularly, U.S. patent application US2003/0135696A1 and U.S. Pat. No. 6,704,845B2 both describe replacement policy methods for replacing entries in the snoop filter for a coherence directory based approach including a snoop filter. The snoop filter contains information on cached memory blocks—where the cache line is cached and its status. The U.S. patent application US2004/0003184A1 describes a snoop filter containing sub-snoop filters for recording even and odd address lines which record local cache lines accessed by remote nodes (sub-filters use same filtering approach). Each of these disclosures do not teach or suggest a system and method for locally reducing the number of snoop requests presented to each cache in a multiprocessor system. Nor do they teach or suggest coupling several snoop filters with various filtering methods, nor do they teach or suggest providing point-to-point interconnection of snooping information to caches.

U.S. patent applications US2003/0070016A1 and US2003/0065843A1 describe a multi-processor system with a central coherency directory containing a snoop filter. The snoop filter described in these applications reduces the number of cycles to process a snoop request, however, does not reduce the number of snoop requests presented to a cache.

U.S. Pat. No. 5,966,729 describes a multi-processor system sharing a bus using a snooping approach for cache coherence and a snoop filter associated locally to each processor group. To reduce snooping activity, a list of remote processor groups "interested" and "not-interested" in particular cache line is kept. Snoop requests are forwarded only to the processor groups marked as "interested" thus reducing the number of broadcasted snoop requests. It does not describe how to reduce the number of snoop requests to a local processor, but rather how to reduce the number of snoop requests sent to other processor groups marked as "not interested". This solution requires keeping a list with information on interested groups for each line in the cache for a processor group, which is comparable in size to duplicating the cache directories of each processor in the processor group thus significantly increasing the size of chip.

U.S. Pat. No. 6,389,517B1 describes a method for snooping cache coherence to allow for concurrent access on the cache from both the processor and the snoop accesses having two access queues. The embodiment disclosed is directed to a shared bus configuration. It does not describe a method for reducing the number of snoop requests presented to the cache.

U.S. Pat. No. 5,572,701 describes a bus-based snoop method for reducing the interference of a low speed bus to a high speed bus and processor. The snoop bus control unit buffers addresses and data from the low speed bus until the processor releases the high speed bus. Then it transfers data and invalidates the corresponding lines in the cache. This disclosure does not describe a multiprocessor system where all components communicate via a high-speed bus.

A. Moshovos, G. Memik, B. Falsafi and A. Choudhary, in a reference entitled "JETTY: filtering snoops for reduced energy consumption in SMP servers" ("Jetty") describe several proposals for reducing snoop requests using hardware filter. It describes the multiprocessor system where snoop requests are distributed via a shared system bus. To reduce the number of snoop requests presented to a processor, one or several various snoop filters are used.

However, the system described in Jetty has significant limitations as to performance, supported system and more specifically interconnect architectures, and lack of support for multiporting. More specifically, the approach described in Jetty is based on a shared system bus which established a common event ordering across the system. While such global time ordering is desirable to simplify the filter architecture, it limited the possible system configurations to those with a single shared bus. Alas, shared bus systems are known to be limited in scalability due to contention to the single global resource. In addition, global buses tend to be slow, due to the high load of multiple components attached to them, and inefficient to place in chip multiprocessors.

Thus, in a highly optimized high-bandwidth system, it is desirable to provide alternate system architectures, such as star, or point-to-point implementations. These are advantageous, as they only have a single sender and transmitter, reducing the load, allowing the use of high speed protocols, and simplifying floor planning in chip multiprocessors. Using point to point protocols also allows to have several transmissions in-progress simultaneously, thereby increasing the data transfer parallelism and overall data throughput.

Other limitations of Jetty include the inability to perform snoop filtering on several requests simultaneously, as in Jetty, simultaneous snoop requests from several processors have to be serialized by the system bus. Allowing the processing of several snoop requests concurrently would provide a significant increase in the number of requests which can be handled at any one time, and thus increase overall system performance.

Having set forth the limitations of the prior art, it is clear that what is required is a system incorporating snoop filters to increase overall performance and power efficiency without limiting the system design options, and more specifically, methods and apparatus to support snoop filtering in systems not requiring a common bus.

Furthermore, there is a need for a snoop filter architecture supporting systems using point-to-point connections to allow the implementation of high performance systems using snoop filtering.

There is a further need for the simultaneous operation of multiple snoop filter units to concurrently filter requests from multiple memory writers to increase system performance.

There is further a need to provide novel, high performance snoop filters which can be implemented in a pipelined fashion to enable high system clock speeds in systems utilizing such snoop filters.

There is an additional need for snoop filters with high filtering efficiency transcending the limitations of prior art.

SUMMARY OF THE INVENTION

It is therefore an object of the present invention to provide a novel architecture support for snooping cache coherence which locally reduces the number of snoop requests presented to each cache in cache coherent multiprocessor systems.

It is a further object of the present invention to provide a method and apparatus for effectively reducing the local snooping activity by the addition of a simple hardware device locally to each processor which filters out incoming snoop requests. The snoop filter described is significantly smaller than a mirrored cache directory, and identifies most of the snoop requests which would result in misses by filtering them out, but never filtering out snoop requests for data which are locally cached. Reducing the number of snoop requests per processor increases system performance and reduces power.

Thus, according to a first aspect of the invention, there is provided a snoop filter apparatus associated with a single processing unit of a computing environment having multiple processing units, each processing unit having one or more cache memories associated therewith, the snoop filter comprising:

a first scoreboard data structure having bit locations for tracking data that have been loaded into a cache memory of its associated processor in response to a cache miss;

means for setting the bit locations in the first scoreboard data structure to indicate possibility of data located in the cache memory at a particular address;

means for receiving snoop requests from one or more memory writing sources and decoding an address of the received snoop request;

means for comparing the decoded address against corresponding bits set in the first scoreboard data structure; and, means for forwarding the received snoop request to the processor in response to matching of a bit set in the first scoreboard data structure, or otherwise discarding the snoop request;

whereby a number of snoop requests forwarded to a processing unit is significantly reduced thereby increasing performance of the computing environment.

A second aspect of the invention is directed to a snoop filtering method for supporting cache coherency in a computing environment having multiple processing units, each processing unit having one or more cache memories associated therewith and an associated snoop filter device, the method comprising:

for each snoop filter device in a processing unit:

providing a first scoreboard data structure having bit locations for tracking data that have been loaded into a cache memory of its associated processor in response to a cache miss;

setting the bit locations in the first scoreboard data structure to indicate possibility of data located in the cache memory at a particular address;

receiving snoop requests from one or more memory writing sources and decoding an address of the received snoop request;

comparing the decoded address against corresponding bits set in the first scoreboard data structure; and, forwarding the received snoop request to the associated processor in response to matching of a bit set in the first scoreboard data structure, or otherwise discarding the snoop request, whereby a number of snoop requests forwarded to a processing unit is significantly reduced thereby increasing performance of the computing environment.

In addition, the snoop filter apparatus and method includes a second scoreboard data structure such that, at least one scoreboard is determined to be active, and at least one scoreboard data structure is determined to be historic at any point in time. Further to this, the snoop filter device implementing the scoreboard data structure is operatively coupled with a cache wrap detection logic means for tracking whether every cache line has been replaced in said cache memory since a prior predetermined cache wrap detection state. Thus, in accordance with the present invention, means are provided for switching the content of the active scoreboard data structure into a historic scoreboard data structure upon detection of the cache wrap condition, and resetting the content of at least one active scoreboard.

Furthermore, in accordance with the present invention, a plurality of bits from an address corresponding to a memory request is used for determining the position bit in the scoreboard data structure. The number of bits from the address of memory accesses may be equal to or greater than the number of bits in the scoreboard. In accordance with the present invention, the same determination of the scoreboard bit for an address of a memory access is performed for both snoop requests and the cache memory load requests.

BRIEF DESCRIPTION OF THE DRAWINGS

The objects, features and advantages of the present invention will become apparent to one skilled in the art, in view of the following detailed description taken in combination with the attached drawings, in which.

DETAILED DESCRIPTION OF THE PREFERRED EMBODIMENTS

Figure 3:
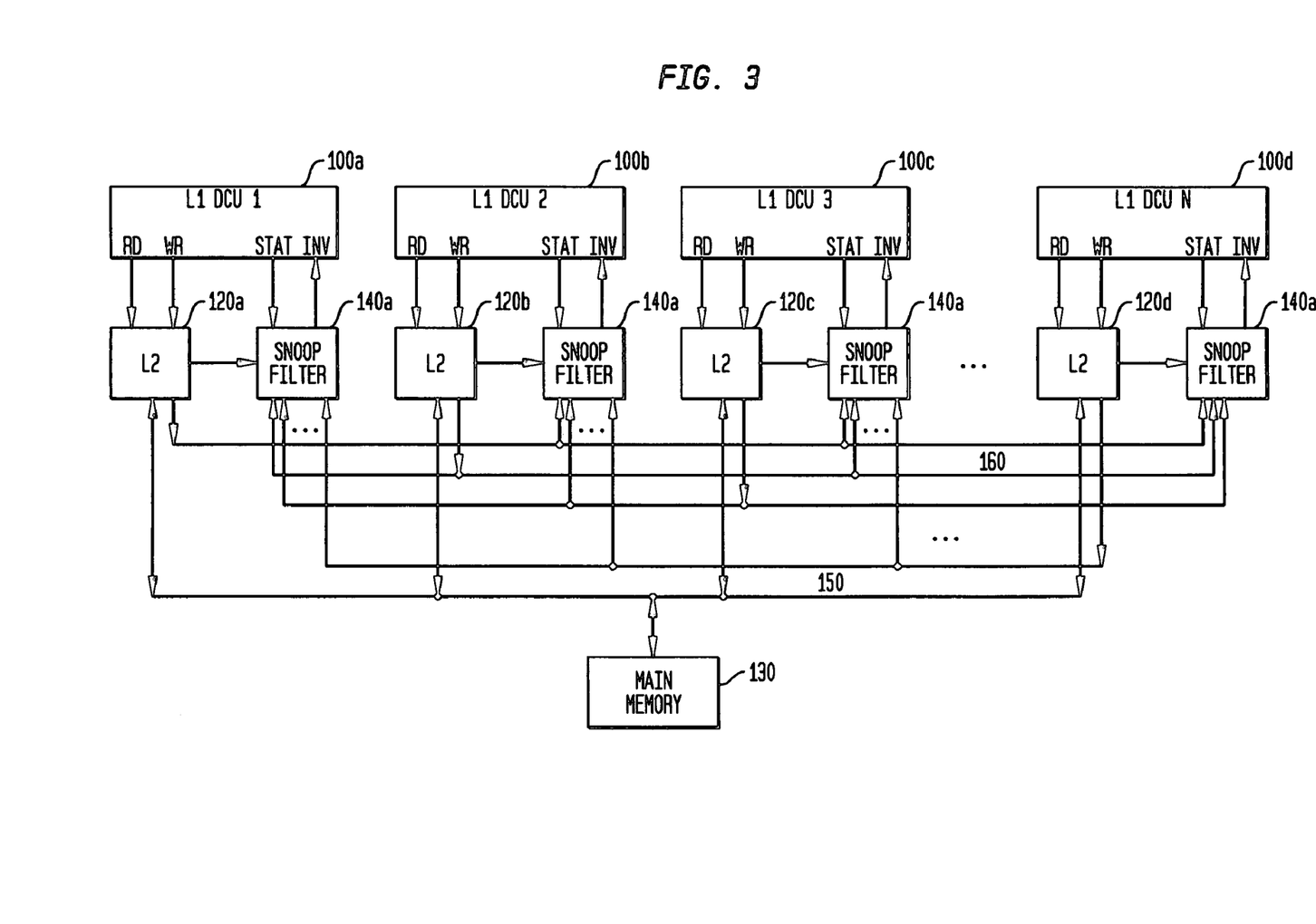
FIG. 3 depicts a base multiprocessor system using snooping approach for cache coherency using a point-to-point connection described according to the present invention.

Referring now to drawings, and more particularly to FIG. 3, there is shown the overall base architecture of the multiprocessor system with the use of snooping approach for cache coherency. In the preferred embodiment, the multiprocessor system is composed of N processors $100a, \ldots, 100n$ (or CPUs labeled $DCU_1$ to $DCU_N$) with their local L1 data and instruction caches, and their associated L2 caches $120a, \ldots, 120n$. The main memory 130 is shared and can be implemented on-chip or off-chip. In the alternative embodiment, instead of main memory, a shared L3 with access to main memory can be used. In the preferred embodiment, the processor cores $100a, \ldots, 100n$ are PowerPC cores such as PPC440 or PPC405, but any other processor core can be used, or some combination of various processors in a single multiprocessor system can be used without departing from the scope of this invention. The processor cores $100a, \ldots, 100n$ are interconnected by a system local bus 150.

To reduce the number of snoop requests presented to a processor, and thus to reduce the impact of snooping on processor and system performance, and to reduce power consumed by unnecessary snoop requests, a snoop filter 140a, . . . ,140n is provided for each respective processor core 100a, . . . , 100n in the multiprocessor system 10. For transferring snooping requests, the preferred embodiment does not use the system bus 150, as typically found in prior art systems, but rather implements a point-to-point interconnection 160 whereby each processor's associated snoop filter is directly connected with each snoop filter associated with every other processor in the system. Thus, snoop requests are decoupled from all other memory requests transferred via the system local bus, reducing the congestion of the bus which is often a system bottleneck. All snoop requests to a single processor are forwarded to the snoop filter 140a, . . . ,140n, which comprises several sub-filters with the same filtering method, or with several different filtering methods, or any combination of the two, as will be described in greater detail herein. The snoop filter processes each snoop request, and presents only a fraction of all requests which are possibly in the processor's cache to the processor.

For each processor, snoop requests are connected directly to all other processors' snoop filters using a point-to-point interconnection 160. Thus, several snoop requests (resulting from write and invalidate attempts) from different processors can occur simultaneously. These requests are no longer serialized, as in the typical snooping approach using the system bus, where this serialization is performed by the bus. That is, multiple snoop requests can be processed in the snoop filter concurrently, as will be described herein in further detail. As a processor has only one snoop port, the snoop requests not filtered out by a snoop filter will be serialized in a queue to be presented to the processor. However, the number of requests passed to the processor is much less than the pre-filtered number of all snoop requests, reducing the impact of cache coherence implementation on system performance.

It should be understood that in an alternative embodiment of the invention with a base multiprocessor system using snooping approach for cache coherency with point-to-point interconnection for snooping requests, the snoop filter may be placed between the L2 cache and the main memory 130. All snoop requests to a single processor are forwarded to its snoop filter, which processes each snoop request, and forwards only an appropriate fraction of all requests to the processor. In this embodiment, the snoop requests are filtered at the L2 cache level (not at L1, as in the embodiment illustrated in FIG. 3), but the presented invention is applicable to any cache level, and can be used for other levels of the cache hierarchy without departing from the scope of the invention.

Figure 4:
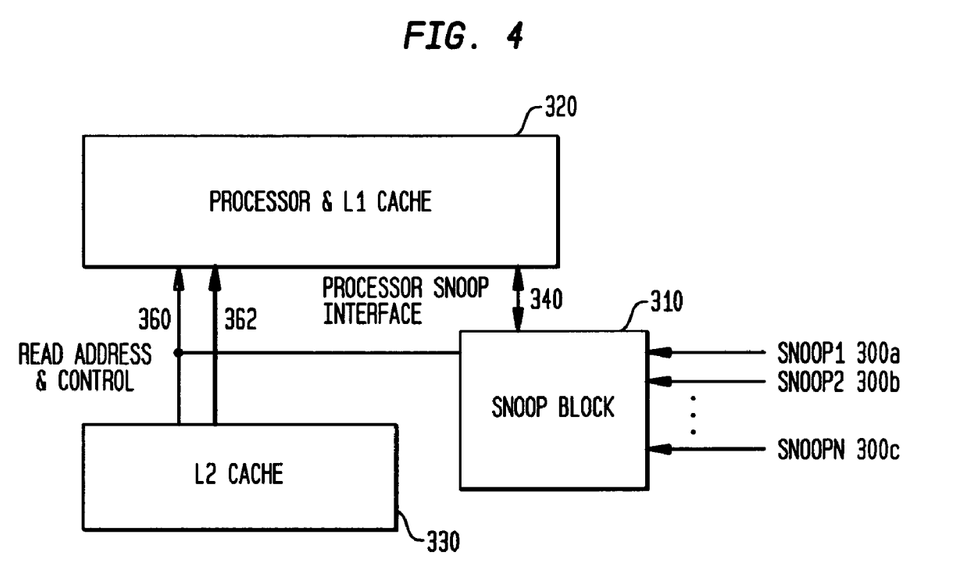
FIG. 4 depicts a high level schematic of a snoop filter block in accordance with a preferred embodiment of the invention.

Referring now to FIG. 4, there is depicted a high level block diagram of the snoop filter device according to the present invention. Snoop requests from all other processors 1 to N in a multiprocessor system are forwarded to the snoop filter device 310 via dedicated point-to-point interconnection inputs 300a, . . . ,300n. The snoop filter device 310 filters the incoming snoops and forwards the appropriate subset to the processor 320 via the processor snoop interface 340. In addition, the snoop filter device 310 monitors all memory access requests from the processor and L1 data cache block 320 to the L2 cache 330. These are essentially only requests which miss in the L1 cache. The snoop block monitors all read address and control signals 360 and 362 to update its filters accordingly.

Figure 5:
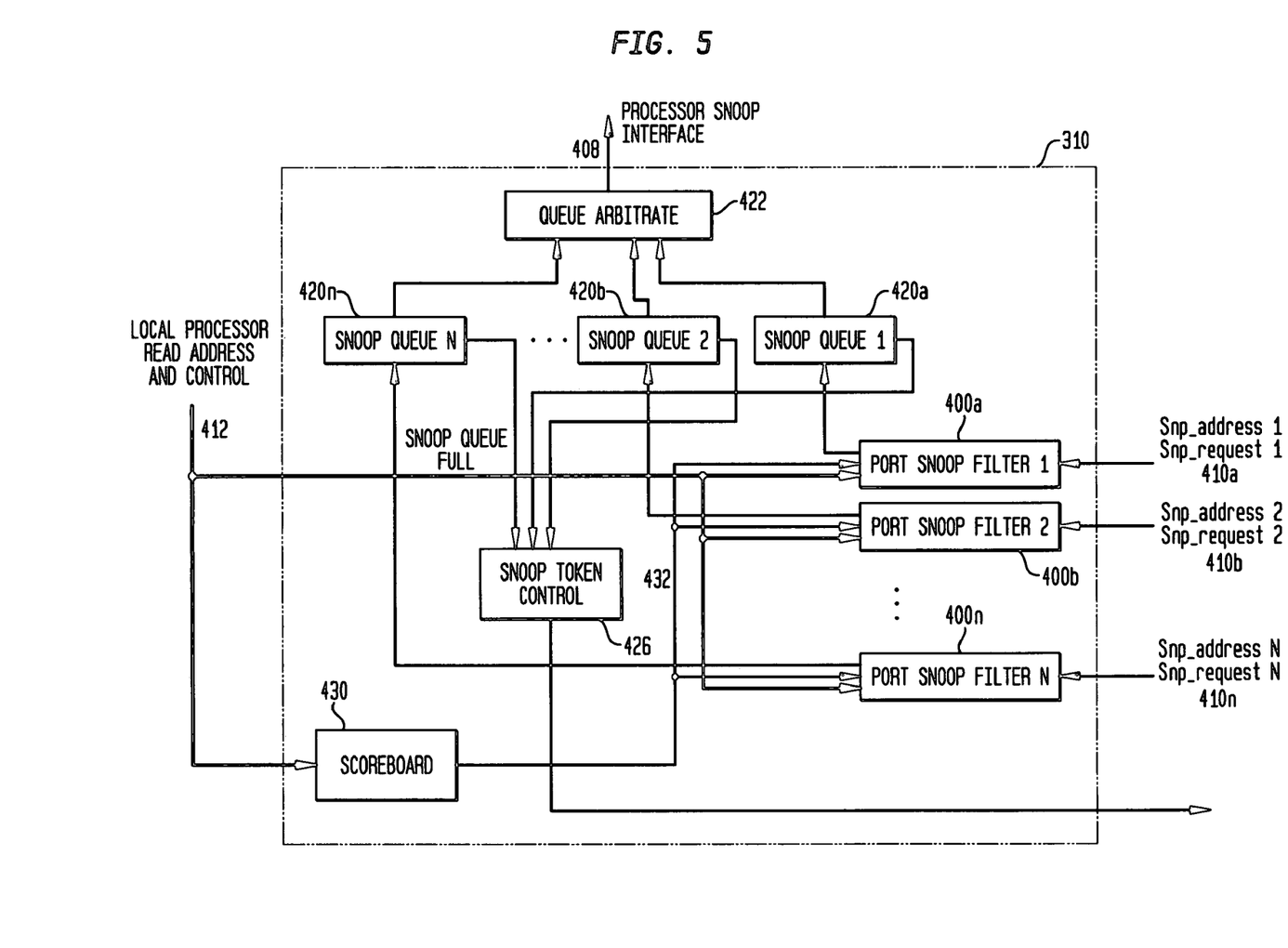
FIG. 5 is a high level schematic of the snoop block containing multiple snoop filters according to the present invention.

FIG. 5 depicts a high level schematic of the snoop block 310 depicted in FIG. 4. As shown in FIG. 5, the snoop block 310 includes multiple ("N") port snoop filters 400a, . . . , 400n that operate in parallel, with each dedicated only to one source of N memory writers (processors or a DMA engine sub-system, etc.). Each of the port snoop filters 400a, . . . , 400n receive on its dedicated input 410a, . . . ,410n snoop requests from a single source which is directly connected point-to-point. The snoop block 310 additionally includes a scoreboard data structure block 430 and snoop token control block 426. In addition, each port snoop filter 400a, . . . ,400n monitors all memory read access requests 412 from its associated processor which miss in the processor's L1 level cache. This information is also provided to the scoreboard data structure block 430 for use as will be described in greater detail herein.

In operation, the port snoop filters 400a, . . . ,400n process the incoming snoop requests and forward a subset of all snoop requests to a respective snoop queue 420a, . . . ,420n having one queue associated with each snoop port. A queue arbitration block 422 is provided that arbitrates between all the snoop queues 420 and serializes all snoop requests from the snoop queues 420 fairly. Logic is provided to detect a snoop queue overflow condition, and the status of each queue is an input to a snoop token control unit 426 that controls flow of snoop requests from the remote memory writers. A memory writer—being a processor or a DMA engine—can submit a write to the memory and a snoop request to all snoop filters only if it has a token available from all snoop filters. The only snoop filter from which a processor does not need a token available to submit a write is its own local snoop filter. This mechanism ensures that the snoop queues do not overflow. From the snoop queue selected by arbiter 422, snoop requests are forwarded to the processor via a processor snoop interface 408.

Figure 6:
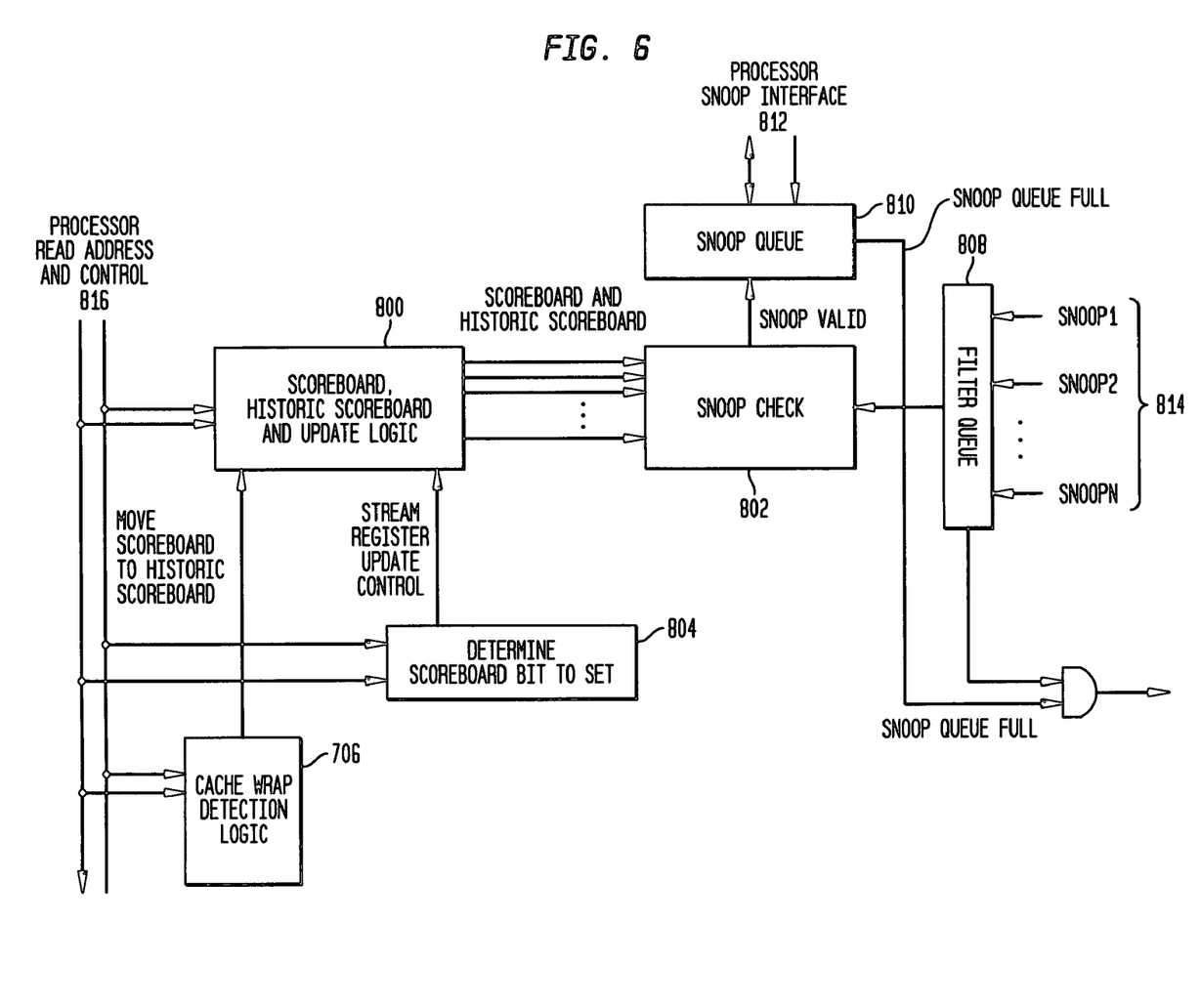
FIG. 6 is a block diagram depicting the snoop filter implementing the scoreboard data structures according to the present invention.

FIG. 6 depicts an alternative embodiment of the snoop filter device 310 of FIG. 4. In the alternative embodiment, the snoop filter device comprises: a scoreboard unit having two sets of scoreboard data structures 800: the scoreboard registers, and historic scoreboard registers; a snoop check logic block 802; a cache wrap detection logic block 706, a scoreboard's bit selection logic block 804; a filter queue block 808 and a processor snoop queue block 810. The scoreboard unit 800 keeps track of recent data that were loaded into the cache of the processor.

In the preferred embodiment, all new snoop requests 814 are queued in the filter queue 808, where concurrent snoop requests from all snoop sources are serialized and queued. The filter queue 808 implements logic for detecting a snoop filter queue overflow condition. As will be described, for each new snoop request, the snoop request address is checked against the both scoreboard and the historic scoreboard units by the snoop check logic block 802 which functions as a port snoop filter. However, it is understood that the snoop filter device 310 may include N snoop check logic blocks 802 that function as port snoop filters, with N port snoop filters operating in parallel, each dedicated only to one source of N memory writers. Each of the N port snoop filters receive on its dedicated input snoop requests from a single source that is connected point-to-point.

For each new snoop request, the snoop request address is checked against the both scoreboard and the historic scoreboard units by the snoop check logic 802. If the decoded address of the snoop request matches the corresponding bits recorded in the scoreboard or in the historic scoreboard, the snooped data are possibly located in the cache, and the snoop request is queued to the processor snoop queue 810, and then forwarded to the processor snoop interface 812.

The cache wrap detection logic 706 and scoreboard bit selection logic 804 receive cache load requests (read address and control signals) 816 from the processor which have missed in the L1 cache. For each cache line loaded in the cache, one of the bits in the scoreboard unit 800 is selected for update by the bit selection logic 804.

In the bit selection logic block 804, a bit in the scoreboard registers is selected based on the selected address bits of the line loaded in the cache and depending on the selection scheme implementation. One possible selection schemes for selecting one bit in the scoreboard sized $2^m$ is to take m bits from the loaded address signal 816, and use them directly as a bit address inside of the scoreboard. The m bits of address can be consecutive bits in the address, or can be dispersed through the address, or some combination of two. For example, two groups of consecutive m/2 bits can be used. Another possible selection scheme uses L bits from the loaded address, applying a Hash function on them, as would be well known in the art to implement, to get equal distribution of all possible addresses across $2^m$ scoreboard bit entries. It is understood that one skilled in the art may implement some other selection and mapping criteria for mapping uniformly all memory addresses across the scoreboard bits can be used without departing from the scope of the invention.

The cache wrap detection logic 706 keeps track of whether every cache line has been replaced since the last cache wrap detection logic reset. To accomplish this, the cache wrap detection logic block 706 tracks the read address and control busses at the cache interface 816. In this way it can mirror the cache replacement policy and keep its state exactly in sync with the cache directory. Once all victim pointers have incremented through an entire sequence, the cache is considered to have every line replaced.

Figure 7:
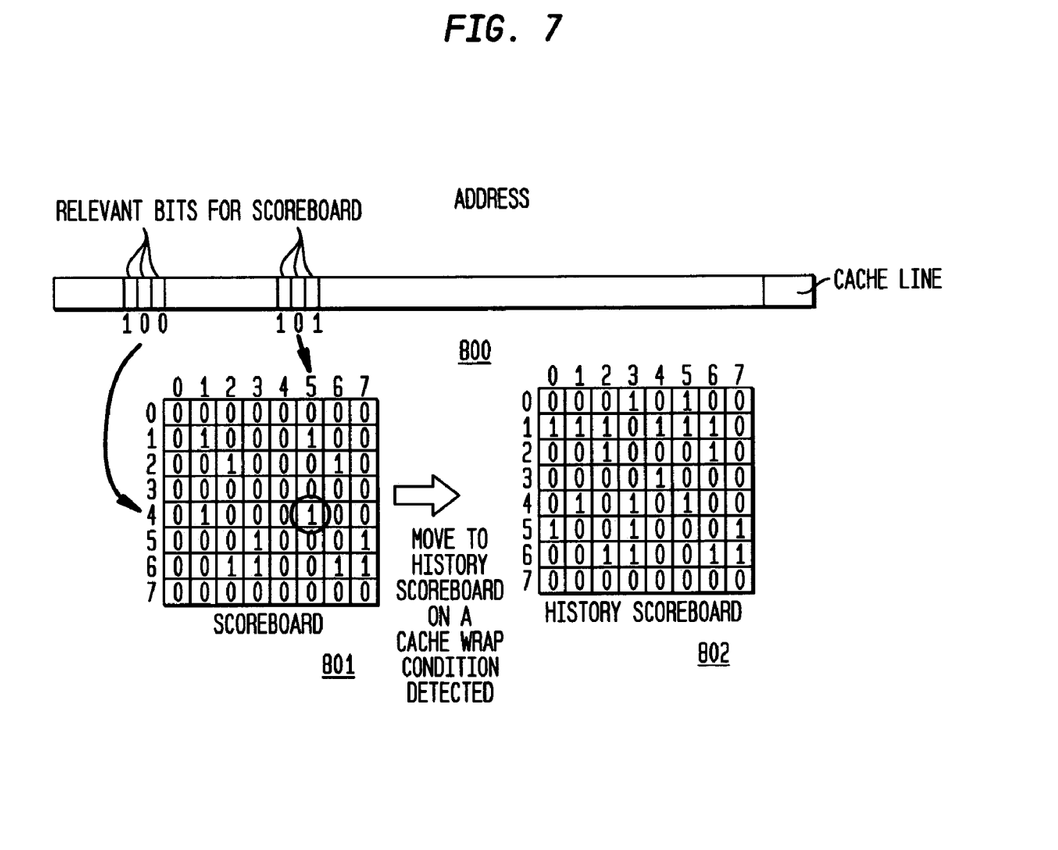
FIG. 7 illustrates an exemplary diagram depicting the internal organization of a scoreboard and history scoreboard register blocks according to the present invention.

FIG. 7 illustrates implementation of two data structure blocks comprising the scoreboard filter: the active scoreboard data structure 801 and the history scoreboard data structure 802. Each scoreboard block has $2^m$=M bits, where m is the number of bits from the address used for the scoreboard. In the exemplary embodiment, m=6 and M=64, as $2^6$=64. For illustrative purposes, each scoreboard data structure 801, 802 is depicted in FIG. 7 as a two dimensional array, e.g., an 8×8 array of bits in the example embodiment depicted. It is understood that there may be many ways for storing two dimensional arrays of data in a processing unit.

For each new memory request of the local processor that missed in the L1 cache, one of the M bits in the active scoreboard 801 is set. Which bit exactly is going to be set depends on the implemented selection criteria. In the example embodiment as described herein, the selection criterion chooses an amount of bits, e.g., six (6) bits from the memory request address on the cache line boundary. The illustrated embodiment takes two sets of subsequent streams of bits from the address, each being three bits long, but any other selection function can be implemented. An example of such a function is to take the most significant 6 bits of the address, or selecting some predefined bit positions. Yet another selection criteria is to choose L bits from the loaded address where L>m, to perform some Hash function on them to get equal distribution of all possible addresses across $2^m$ scoreboard bit entries. Other selection criteria are possible and can be implemented without departing from the scope of the invention.

In one embodiment, the scoreboard unit is doubled to allow for the scoreboard to be "reset". That is, because the scoreboard keeps track of content of the cache during a time needed for all cache lines to be replaced once, once all cache lines have been replaced, the information in the scoreboards is no longer of value. The current content of the active scoreboard 801 is copied into the history scoreboard 802 and the active scoreboard is cleared. The cache wrap detection logic 706 keeps track of the replacement of cache lines, and once all cache lines have been replaced the indication is set to the scoreboard to copy its current contents into the history scoreboard. The scoreboard is cleared, and the process of tracking all cache lines that are loaded in the L1 cache continues from the beginning.

Figure 8:
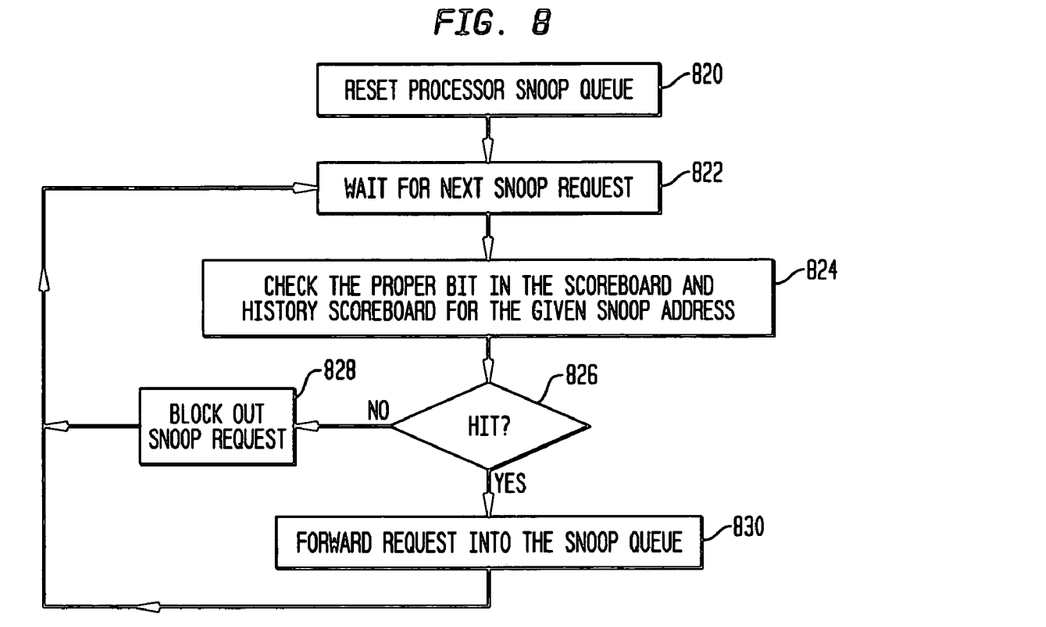
FIG. 8 depicts the control flow for filtering snoop requests using the scoreboard data structure of the snoop filter according to the present invention; and, FIG. 9 illustrates the control flow logic for updating the scoreboard data structures for the snoop filter embodiment of the invention.

Referring now to FIG. 8, there is depicted the control flow process for the snoop filter using the active scoreboard and history scoreboard. At the start of operation all snoop queues are reset as indicated at step 820, and the system waits for the next snoop requests from any snoop source as indicated at step 822. Then, as indicated at step 824, when the new snoop request is received, the particular bit in the scoreboard is selected, depending on the mapping function implemented for mapping addresses onto scoreboard bits. The same bit is also checked in the history scoreboard. If the selected bit is set in either the scoreboard or history scoreboard, i.e., indicating a hit at step 826, the snooped cache line might be in the cache. The snoop request is then forwarded to the cache by placing the snoop request into snoop queue in the step 830. If, however, for the snoop request, the selected bit is not set in either of the active or history scoreboards as determined at step 826, the snooped cache line is guaranteed not in the cache. Thus, this snoop request is filtered out in the step 828.

Figure 9:
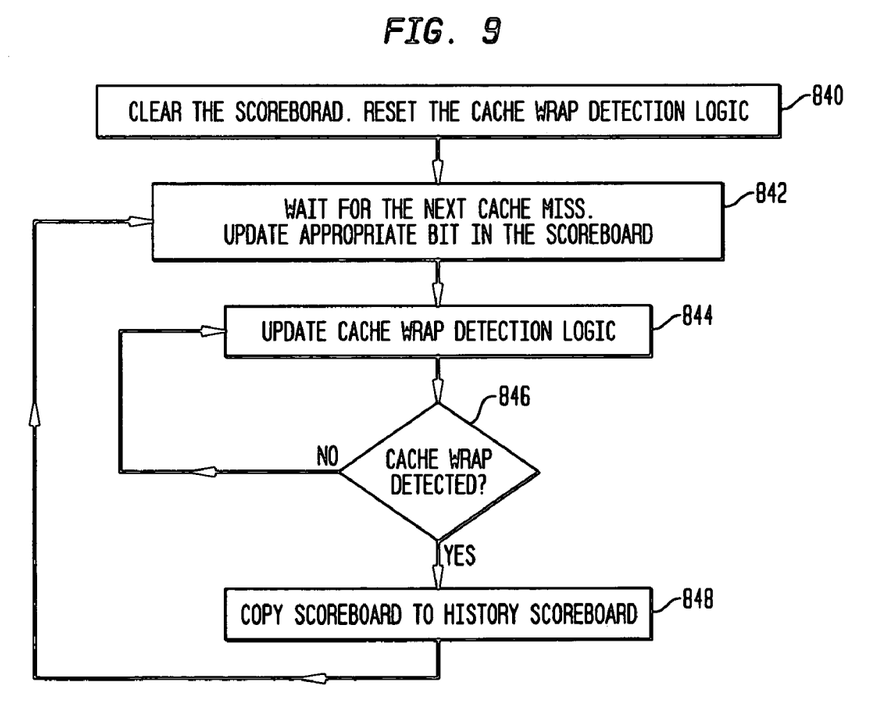

Referring now to FIG. 9, there is depicted the control flow for updating the scoreboard and the cache wrap detection logic for the replaced cache lines. At the start of operation, all scoreboard bits are reset and the cache wrap detection logic is cleared as indicated at step 840. For each new cache line loaded into L1 level cache, the address of the memory request is added to the scoreboard. Depending on the address mapping function implemented, the proper bit in the scoreboard is set as indicated at step 842. Then, at step 844, the cache wrap detection logic is updated to reflect the new data loaded in the cache. Then as indicated at step 846, the cache wrap detection logic block tracks whether all lines in the cache have been replaced since the scoreboard had been cleared, i.e., detects whether a cache wrap detection condition exists. If this condition is not detected in step 846, the control flow loops back to the step 842 where the system waits for the next processor memory request. Otherwise, the control continues to the step 848. At step 848, once the cache wrap is detected, the content of the scoreboard is copied into the history scoreboard. The flow control loops back to the step 840, to clear the cache wrap detection unit and the scoreboard.

The scoreboard port filters rely upon knowing when the entire contents of a cache have been replaced, relative to a particular starting state—a cache wrap condition as referred to herein. A set-associative cache is considered to have wrapped when all of the sets within the cache have been replaced. Normally, some sets will be replaced earlier than others and will continue to be updated before all sets have been replaced and the cache has wrapped. Therefore, the starting point for cache wrap detection is the state of the cache sets at the time of the previous cache wrap. In one exemplary embodiment, a set-associative cache that uses a round-robin replacement algorithm is provided. However, a cache wrap detection may additionally be achieved when the cache implements an arbitrary replacement policy, including least-recently-used and random. Commonly-owned, co-pending U.S. patent application Ser. No. 11/093,132 entitled METHOD AND APPARATUS FOR DETECTING CACHE WRAP CONDITION FOR A SNOOP FILTER, the whole contents and disclosure of which is incorporated by reference as if fully set forth in detail herein, describe in greater detail several cache wrap detection logic implementation schemes for an N-way set-associative cache.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

Having thus described our invention, what we claim as new, and desire to secure by Letters Patent is:

1. A snoop filtering method for supporting cache coherency in a computing environment having multiple processing units, each processing unit having one or more cache memories associated therewith and an associated snoop filter device, said method comprising the steps of:

for each snoop filter device of a processing unit:
providing a first scoreboard data structure having bit locations for tracking data that have been loaded into a cache memory of its associated processor in response to a cache miss;
setting said bit locations in said first scoreboard data structure to indicate possibility of data located in said cache memory at a particular address;
receiving snoop requests from one or more processing units and decoding an address of the received snoop request;
comparing said decoded address against corresponding bits set in said first scoreboard data structure; and,
forwarding said received snoop request to said associated processor in response to matching of a bit set in said first scoreboard data structure, or otherwise discarding said snoop request,
determining a cache wrap detection condition by tracking whether every cache line has been overwritten with new cache line content in said cache memory since a prior detected cache wrap condition; and,
providing a second scoreboard data structure having corresponding bit locations as said first scoreboard data structure; and,
copying contents of first scoreboard data structure into said second scoreboard data structure upon detection of a cache wrap detection condition indicating all cache lines have been overwritten with new cache line content.

2. The snoop filtering method as claimed in claim 1, wherein said step of forwarding said received snoop request to said processing unit includes the step of enqueuing said snoop request in a processor snoop filter queue.

3. The snoop filtering method as claimed in claim 2, further comprising the step of : arbitrating between all enqueued snoop cache line requests and serializing all snoop cache line requests for input to said processing unit.

4. The snoop filtering method as claimed in claim 1, wherein said step of setting bit locations in said first scoreboard data structure utilizes a bit selection scheme.

5. The snoop filter as claimed in claim 4, wherein said first scoreboard data structure comprises $2^m$ bit locations, said bit selection scheme comprises utilizing m bits from the address of the loaded cache data to directly set a bit location in scoreboard data structure.

6. The snoop filter as claimed in claim 5, wherein said m bits utilized from the address of the loaded cache data are consecutive bit locations of the address.

7. The snoop filter as claimed in claim 5, wherein said m bits utilized from the address of the loaded cache data are dispersed though the address.

8. The snoop filter as claimed in claim 5, wherein bits utilized from the address of the loaded cache data are at consecutive bit locations, are dispersed through the address, or combination thereof.

9. The snoop filter as claimed in claim 4, wherein said means for selling said bit locations comprises means for applying a Hash function utilizing L bits from the address of the loaded cache data to directly set a bit location in first scoreboard data structure.

10. The snoop filter as claimed in claim 9, wherein said first scoreboard data structure comprises $2^m$ bit locations, wherein an amount of said L bits are utilized such that L>m.

11. The snoop filtering method as claimed in claim 1, further comprising a step of: resetting contents of said first scoreboard data structure upon detection of said cache wrap condition.

12. The snoop filtering method as claimed in claim 1, wherein said step of decoding an address of a received snoop request further comprises the step of: comparing said decoded address against corresponding bits of said second scoreboard data structure, and forwarding said received snoop request to said processor in response to matching of a bit set in said second scoreboard data structure or said first scoreboard data structure.

\* \* \* \* \*